United States Patent
Yasir (10) Patent No.: US 12,093,302 B2
(45) Date of Patent: *Sep. 17, 2024

(54) METHODS AND SYSTEMS FOR GENERATING AND PRESENTING CONTENT RECOMMENDATIONS FOR NEW USERS

(71) Applicant: Rovi Guides, Inc., San Jose, CA (US)

(72) Inventor: Mohammed Yasir, Kerala (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/133,350

(22) Filed: Apr. 11, 2023

(65) Prior Publication Data

US 2023/0252068 A1    Aug. 10, 2023

Related U.S. Application Data

(63) Continuation of application No. 16/881,747, filed on May 22, 2020, now Pat. No. 11,657,080.

(30) Foreign Application Priority Data

Apr. 9, 2020    (IN) .............................. 202021015651

(51) Int. Cl.
| | |
|---|---|
| *G06F 16/00* | (2019.01) |
| *G06F 16/435* | (2019.01) |
| *G06F 16/906* | (2019.01) |
| *G06F 16/9535* | (2019.01) |
| *G06F 18/23213* | (2023.01) |
| *G06N 20/00* | (2019.01) |
| *H04N 21/45* | (2011.01) |

(Continued)

(52) U.S. Cl.
CPC .......... *G06F 16/435* (2019.01); *G06F 16/906* (2019.01); *G06F 16/9535* (2019.01); *G06F 18/23213* (2023.01); *G06N 20/00* (2019.01); *H04N 21/4532* (2013.01); *H04N 21/4662* (2013.01); *H04N 21/4668* (2013.01); *H04N 21/4826* (2013.01)

(58) Field of Classification Search
None
See application file for complete search history.

(56) References Cited

U.S. PATENT DOCUMENTS

| | | |
|---|---|---|
| 8,302,127 B2 | 10/2012 | Klarfeld et al. |
| 8,706,721 B1 | 4/2014 | Eaves |

(Continued)

*Primary Examiner* — Anhtai V Tran
(74) *Attorney, Agent, or Firm* — Haley Guiliano LLP (57) ABSTRACT

Systems and methods for generating and presenting content recommendations to new users during or immediately after the onboarding process, before any history of the new user's viewed content is available. A machine learning or other model may be trained to determine clusters of content genre values corresponding to genres of content watched by viewers. Clusters are thus associated with popular groupings of content genres viewed by many users. Clusters representing popular groupings of content genres may be selected for new users, and content corresponding to the selected clusters may be recommended to the new users as part of their onboarding process. A sufficient amount of content may be selected to fully populate any content recommendation portion of a new user onboarding page.

15 Claims, 10 Drawing Sheets

(51) Int. Cl.
    *H04N 21/466*     (2011.01)
    *H04N 21/482*     (2011.01)

(56) References Cited

U.S. PATENT DOCUMENTS

| | | |
|---|---|---|
| 11,657,080 B2 | 5/2023 | Yasir |
| 2003/0093792 A1 | 5/2003 | Labeeb et al. |
| 2003/0097196 A1 | 5/2003 | Gutta et al. |
| 2003/0236770 A1* | 12/2003 | Kurapati ............ H04N 21/4661 |
| 2004/0054572 A1 | 3/2004 | Oldale et al. |
| 2005/0086301 A1 | 4/2005 | Eichler et al. |
| 2009/0282343 A1 | 11/2009 | Catlin et al. |
| 2011/0258049 A1 | 10/2011 | Ramer et al. |
| 2013/0097102 A1 | 4/2013 | Revesz |
| 2016/0260341 A1 | 9/2016 | Baughman et al. |
| 2017/0289226 A1* | 10/2017 | Deshpande ...... H04N 21/25866 |
| 2018/0067641 A1 | 3/2018 | Lerner et al. |
| 2018/0068023 A1 | 3/2018 | Douze et al. |
| 2019/0130436 A1 | 5/2019 | Ma et al. |
| 2019/0373331 A1 | 12/2019 | Benzatti et al. |
| 2020/0184515 A1 | 6/2020 | Dewet et al. |
| 2021/0304285 A1* | 9/2021 | Alahmady ......... G06Q 30/0201 |
| 2021/0319072 A1 | 10/2021 | Yasir |
| 2021/0321165 A1 | 10/2021 | Yasir |

\* cited by examiner

FIG. 1

Selected New User Classification(s)

↓

ML Model 200

↓

Genre(s)

↓

Recommendation Engine 210

↓

Recommended Content

FIG. 2

Content preferences (other than new user)

↓

ML Model — 300

↓

Classification Boundaries

| Genre | Code | Genre | Code |
|---|---|---|---|
| Adventure | 1 | Children | 8 |
| Action | 2 | Documentary | 9 |
| Drama | 3 | Sci-Fi | 10 |
| Comedy | 4 | Musical | 11 |
| Thriller (crime) | 5 | Animation | 12 |
| Horror | 6 | Others | 13 |
| Romantic Comedy - Romance | | | 7 |

METHODS AND SYSTEMS FOR GENERATING AND PRESENTING CONTENT RECOMMENDATIONS FOR NEW USERS

CROSS REFERENCE TO RELATED APPLICATIONS

This application is a continuation of U.S. patent application Ser. No. 16/881,747, filed May 22, 2020, which claims priority to, and the benefit of, Indian Provisional Patent Application No. 202021015651 filed on Apr. 9, 2020, the disclosure of which are hereby incorporated by reference herein in their entireties.

BACKGROUND

Embodiments of the disclosure relate generally to content creation systems. More specifically, embodiments of the disclosure relate to methods and systems for generating and presenting content recommendations for new users.

SUMMARY

Content providers use computing systems allowing for a certain amount of ability to recommend content to end-users. Such systems attempt to tailor recommended content to the interests of the user, to present him or her with content he or she may enjoy. Currently, such systems are subject to certain limitations, especially for first users. For instance, conventional systems typically rely on a known user history of content the user has previously viewed or otherwise been interested in, yet new users to a content provider have little user history or none at all. That is, these systems rely on extrapolating current recommended content from past content for which the user expressed interest. Accordingly, in the case of new users, or users for which no user history can be accessed, such systems are unable to generate accurate content recommendations. Conventional systems are thus unsuited to populating new user content recommendation pages with a desired number of accurate recommendations, in particularly, at cold start.

Thus, to overcome the limited ability of computer based systems to match users with effective promotional content, systems and methods are described herein for a computer-based process that selects classes of content for new users, selects content belonging to these classes, and fully populates new user onboarding pages with this selected content. In this manner, new users, or users that have little or no content interaction history, are provided with onboarding or cold start pages, e.g., content pages shown during or immediately after the new user onboarding process, that are fully populated with recommended content, thus providing improvements to content computing systems and providing benefits to new users with a full array of content recommendations at cold start.

In more detail, systems of embodiments of the disclosure may select content for recommendation to new users that do not yet have any associated content preferences. The systems may then transmit representations of this selected content to display fully populated onboarding pages for the new users.

Embodiments of the disclosure thus provide fully populated onboarding pages for new users, i.e., pages displayed as part of or immediately subsequent to the onboarding process, which display the same number of content recommendations as content recommendations pages of users that are not new. Thus, for example, the home page of a new user, when first displayed after onboarding, may display the same amount of recommended content as the home page of an existing user.

Content selection for new users may be performed in any manner. In one embodiment, sets of content preferences, such as accumulated content preferences of existing or previous users, are clustered such as via a machine learning model. The determined clusters may thus each represent clustered or similar content preferences of users other than new users. A cluster may then be selected, as well as a point, or set of content preferences, within the selected cluster, and content can be selected for recommendation according to this selected set of content preferences. In this manner, content may be selected for recommendation to the new user without knowledge or use of any of his or her content preferences.

Clustering may be performed in any manner. One such manner employs a machine learning model such as an expectation maximization (EM) model, a k-means model, or a k-nearest neighbor model, each of which may determine clusters or groupings of unlabeled points such as content preferences of various users. That is, models may determine boundaries in content preference space within which groupings of content preference points are present, where the boundaries define each cluster. Accordingly, trained models with defined content preference clusters may take as input the content preferences of a user, and output the corresponding cluster, i.e., to which cluster a given set of content preferences belongs. Conversely, a point within a given cluster may be selected, and the corresponding content preferences may be output. In this manner, embodiments of the disclosure contemplate clusters determined from known content preferences of previous or existing users in which use of these clusters to select content recommendations for new users. Clusters of content preferences are determined, corresponding to groups of content preferences that are preferred by many users. These clusters can then be selected for new users, as it is more likely that new users will fall into one or more large clusters. Content corresponding to these clusters, or specific points within these clusters, may then be recommended for the new user.

Exemplary machine learning models of embodiments of the disclosure can be trained with sets of content preferences as input, with clusters determined in known manner according to the specific model employed. Any sets of content preferences can be employed. As one example, the content preferences may be genres of content preferred by various users. Training sets, made up of content preferences of many different users, may be used in their entirety to train machine learning models of embodiments of the disclosure. Alternatively, the input set of content preferences may be divided into two different subsets, one used for training and the other used for testing. The machine learning model may then be trained on the training subset of content preferences, which can be tested using the testing subset. Division of the set of content preferences may be performed in any manner, such as by randomly or pseudo-randomly selecting content preference entries for each subset, perhaps according to a predetermined number of entries for each subset. As one example, the set of content preferences may be split with 70% allocated for the training subset and the remaining 30% allocated for the testing subset, with set entries randomly or pseudo-randomly selected for one subset.

Prior to training, certain entries may be removed from the training subset. In particular, popular users, or users who most frequently view content, have the most well-known behavior. Accordingly, their content watching behavior should theoretically follow the cluster space. That is, they are good indicators of whether the clusters have been correctly determined. Entries for these popular users may thus be removed from the training subset and placed in the testing subset for verification of the machine learning model.

Embodiments of the disclosure also contemplate systems that adapt to the behavior of the user as he or she views content. For example, the user's point in the content space of a machine learning model described above may be adjusted according to the user's content preferences, as represented by his or her viewed content. Indications of various content interactions may be received, such as content views or likes, content viewed for more than some predetermined amount of time, mentions of content, or the like. Content preferences or history may then be determined from these interactions. For instance, preferred genres for the user may be shifted toward genres of content the user has recently viewed or liked, or, in other examples, shifted away from genres of content the user has recently disliked. Content may then be selected according to the revised set of preferred genres. The content selected may differ from previously selected content recommendations, as the underlying genre preferences of the user may have changed according to his or her behavior. Representations of the new content recommendation selections may then be transmitted for display to the user.

In further embodiments of the disclosure, an indication of a new user may be received, and one or more classes may be determined for this new user, where each user class may correspond to multiple content preferences. Content may then be selected according to these user classes, whereupon representations of this selected content can be transmitted for display as a fully populated content recommendations portion of an onboarding page. Thus, classes may be selected for new users, and content recommendations may be determined from these classes. The classes may, in one or more embodiments, be content genres, so that content may be selected according to genres determined to correspond to the new user. Classes may be selected according to one or more machine learning models, as above.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

Exemplary embodiments are disclosed of systems and methods for generating and presenting content recommendations to new users during or immediately after the onboarding process, before any history of the new user's viewed content is available. A machine learning or other model is trained to determine clusters of content genre values corresponding to genres of content watched by viewers. Clusters are thus associated with popular groupings of content genres viewed by many users. Clusters representing popular groupings of content genres may be selected for new users, and content corresponding to the selected clusters may be recommended to the new users as part of their onboarding process. Sufficient amount of content may be selected to fully populate any content recommendation portion of a new user onboarding page.

Figure 1:
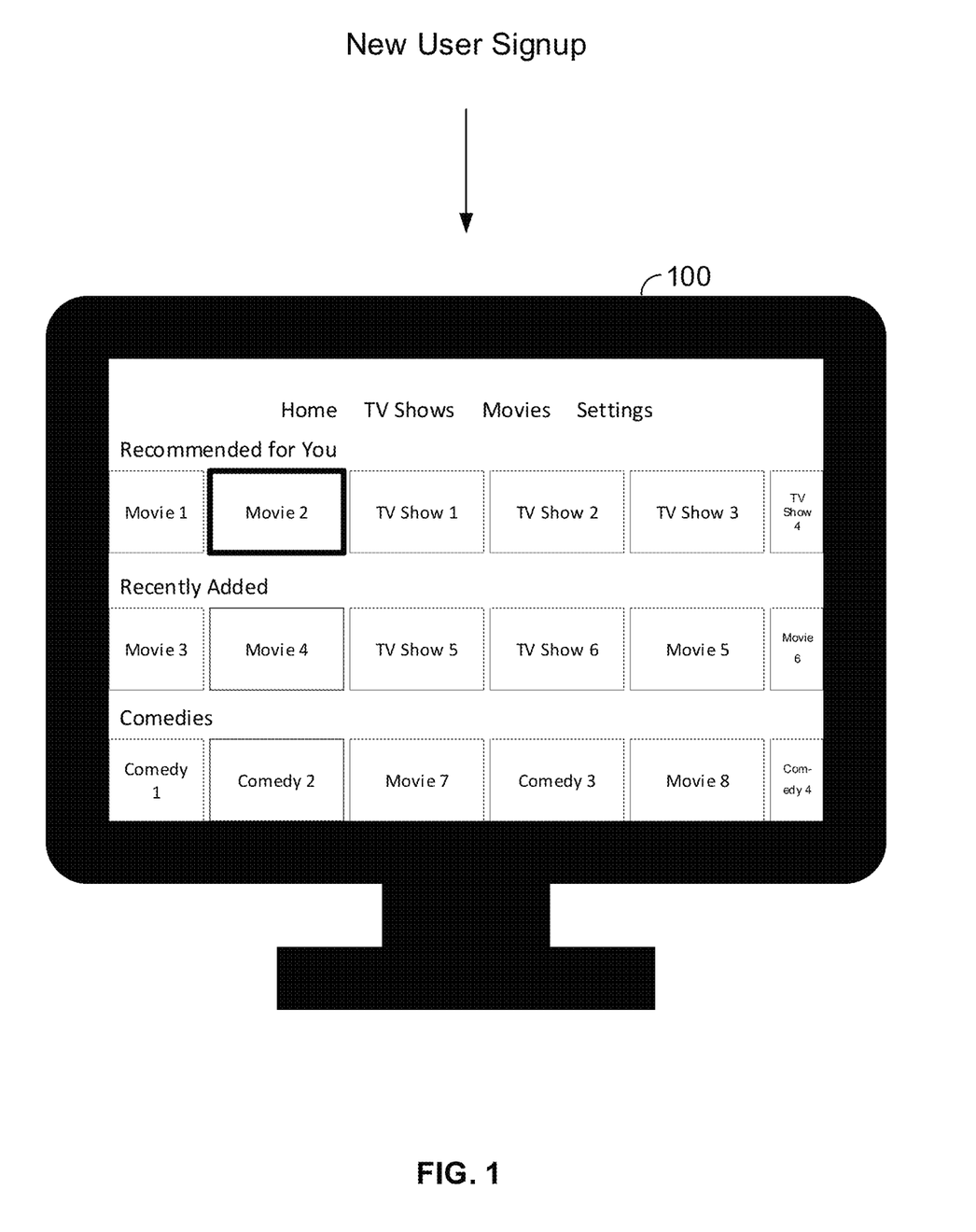
FIG. 1 illustrates exemplary operation of a system for generating and presenting content recommendations to new users, in accordance with embodiments of the disclosure.

FIG. 1 illustrates exemplary operation of a system for generating and presenting content recommendations to new users, in accordance with embodiments of the disclosure. Here, a user may sign up for a content delivery or display service which allows them to select and view various electronic content through an interface displayed on an electronic display 100. The new user may go through an onboarding process, during which he or she typically subscribes to the service through an interface displayed on display 100, and registers by, e.g., creating a user identification. At or shortly before conclusion of the onboarding process, an onboarding page may be displayed for the new user, an example of which is shown within display 100. A portion of this onboarding page, e.g., the top row of the onboarding page displayed by display 100, shows recommended content for the new user. Systems of embodiments of the disclosure select sufficient number of pieces of content to fully populate the recommendation section, e.g., to populate the entire Recommended for You row, or at least the entire portion of that row which is shown on display 100. Recommended content is determined even though the system does not yet have any information on the preferences of the new user, e.g., the system does not have access to any viewing history or information on preferred content genres of the new user.

Figure 2:
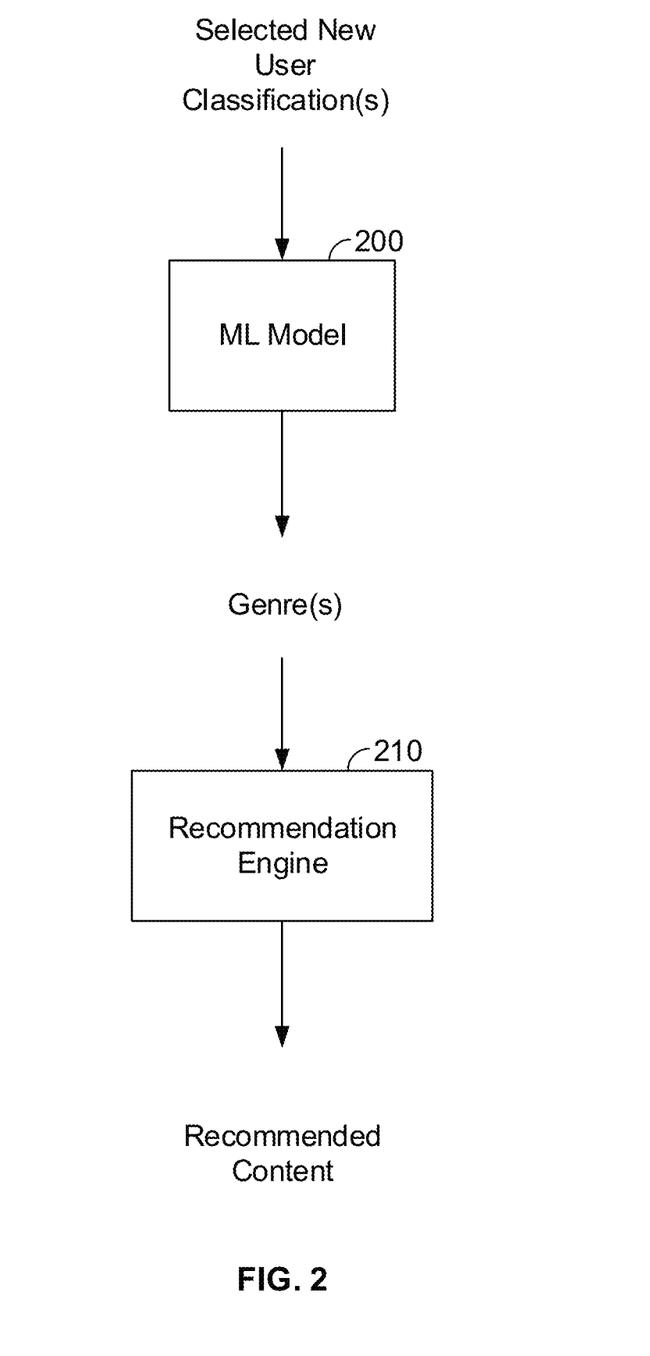
FIG. 2 illustrates an exemplary process for generating and presenting content recommendations to new users, in accordance with embodiments of the disclosure.

Embodiments of the disclosure contemplate generation of fully-populated new user onboarding pages in any manner. FIG. 2 illustrates one such exemplary process for generating and presenting content recommendations to new users, in accordance with embodiments of the disclosure. Here, a machine learning model 200 is trained to output a set of content genres or other content classifications from input new user classifications. In particular, the machine learning model 200 may be a clustering model trained to identify clusters or ranges of content genres that are historically popular with past users, i.e., clusters of points in a hyperspace of content genres, where each point represents a set of content genres preferred by a current or previous user.

In this manner, the machine learning model 200 may take as input a point in a cluster, or point in the content genre hyperspace, and output the genre values corresponding to that point. These genre values may then be input to a recommendation engine 210, which may be any program or process for selecting content recommendations from an input set of preferred genres. That is, the recommendation engine 210 identifies, from an input set of genres, content corresponding to those genres. The recommendation engine 210 thus outputs a set of recommended content for the genres output by machine learning model 200, where the set of recommended content includes sufficient recommended content to fully populate or fill a recommended content section of a new user onboarding page, e.g., the Recommended for You row of the onboarding page shown on display 100 of FIG. 1.

As above, machine learning model 200 may be any clustering model trained to identify clusters or ranges of content genres. For example, the model 200 may be an expectation maximization (EM) model, a k-means model, or a k-nearest neighbor (k-NN) model which may be trained to determine clusters of points in any hyperspace, e.g., a hyperspace of variables that each represent values of a different content genre. Thus, for instance, variables used may include each of the genres listed in FIG. 4 as described further below. The model 200 may be trained on a data set that includes known genre preference values for any number of users. This information may be compiled by, for example, keeping track of content interactions of existing users of the content delivery service, and assigning values to the genre preferences determined therefrom. Genre values may be determined in any manner, such as by assigning genres to each piece of content and incrementing each preference value by a predetermined amount when the corresponding user views or likes content having that genre. Preference values may be normalized so that genre values for each user have a uniform scale.

The model 200 may then be trained on the input data set of existing/previous user genre preference values, to determine the boundaries of clusters of genre preferences. In some embodiments, models such as k-NN models may define boundaries in deterministic manner, while in other embodiments, models such as EM models may define cluster boundaries in probabilistic manner, so that given genre hyperspace points may belong to more than one cluster.

In either case, when a new user is detected, a point in the model 200 hyperspace may be selected for him or her. Embodiments of the disclosure contemplate selection of a hyperspace point in any manner, such as by selecting a particular cluster (e.g., the largest cluster, representing the most popular groupings of genres) and then selecting a point within that cluster, such as the cluster centroid, a random point within the cluster. Alternatively, a hyperspace point may be selected by picking a point randomly or pseudo-randomly, by selecting a cluster at random, by selecting a cluster that is close to or at a center of a number of other clusters, or the like. Points may be picked from selected clusters in any manner, such as by selecting a cluster centroid, picking a point at random or pseudorandom, or the like.

The selected point in the genre hyperspace corresponds to a set of values for each genre. Recommendation engine 210 may then select content for recommendation, according to those genre values. More specifically, recommendation engine 210 may match these genre values with predetermined genre values of content offered by the content service, with the closest matches selected for recommendation to the new user. Matching may be performed in any manner, such as by a least sum of differences between genre values, or the like. Recommended content, or representations thereof, may then be transmitted to the new user as part of the onboarding process.

Figure 3:
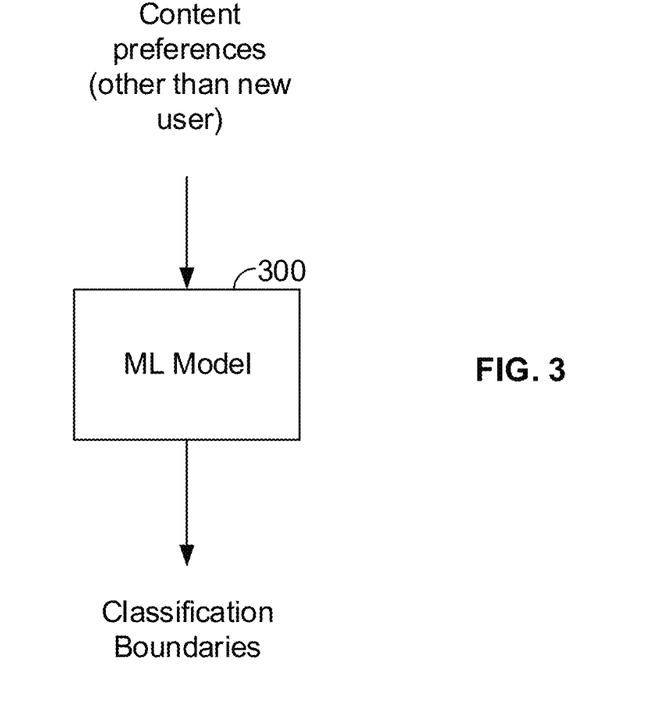
FIG. 3 illustrates further detail of training processes for machine learning operations of embodiments of the disclosure.

FIG. 3 illustrates further detail of training processes for machine learning models of embodiments of the disclosure. In particular, FIG. 3 illustrates further detail of training of machine learning model 200 of FIG. 2. More specifically, a machine learning model 300, which corresponds to machine learning model 200 and may be any machine learning model suitable for determining classifications for values of multiple variables, is configured with various content genres as its variables. The machine learning model 300 thus may be considered to model points in a content genre hyperspace. Model 300 may be trained by input of a data set that includes values of the various content genre variables for many different past users. That is, values corresponding to the content preferences of existing or past users may be entered into model 300, and the model 300 may be trained to determine the boundaries in its genre hyperspace of various clusters or groupings of users that have similar content preferences, shown in FIG. 3 as classification boundaries or boundaries in the content genre hyperspace used by machine learning model 300 which have been determined through training of model 300. Such training processes are known, and embodiments of the disclosure contemplate use of any suitable training process for any suitable classification model.

Figure 4:
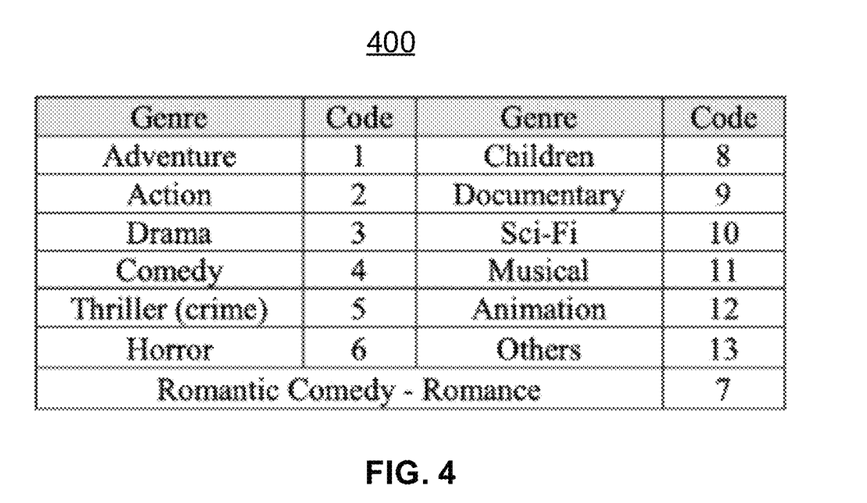
FIG. 4 is a table of exemplary genres used in machine learning operations in accordance with embodiments of the disclosure.

Any genres may be employed as the variables used by machine learning models of embodiments of the disclosure. FIG. 4 is a table 400 of one such set of exemplary genres used in machine learning operations in accordance with embodiments of the disclosure. Here, genres listed in table 400 may be the variables used by machine learning models of embodiments of the disclosure, with code values for each genre being a number arbitrarily assigned to each variable as an identifier thereof. Accordingly, a data point for each user may be a set of values for each genre listed in table 400, where values correspond to the degree of preference a particular user has for that genre. Thus, for example, a user who has a history of viewing action/adventure content may have higher values of variables 1 and 2, and lower values for the remaining variables 3-13, while a user with young children may have higher values of variables 8, 9, and 11 and lower values for other variables. It is noted that the variables, or genres, listed in table 400 are exemplary, and embodiments of the disclosure contemplate use of any alternative variables capable of characterizing user preferences for electronic content in any manner.

Figure 5:
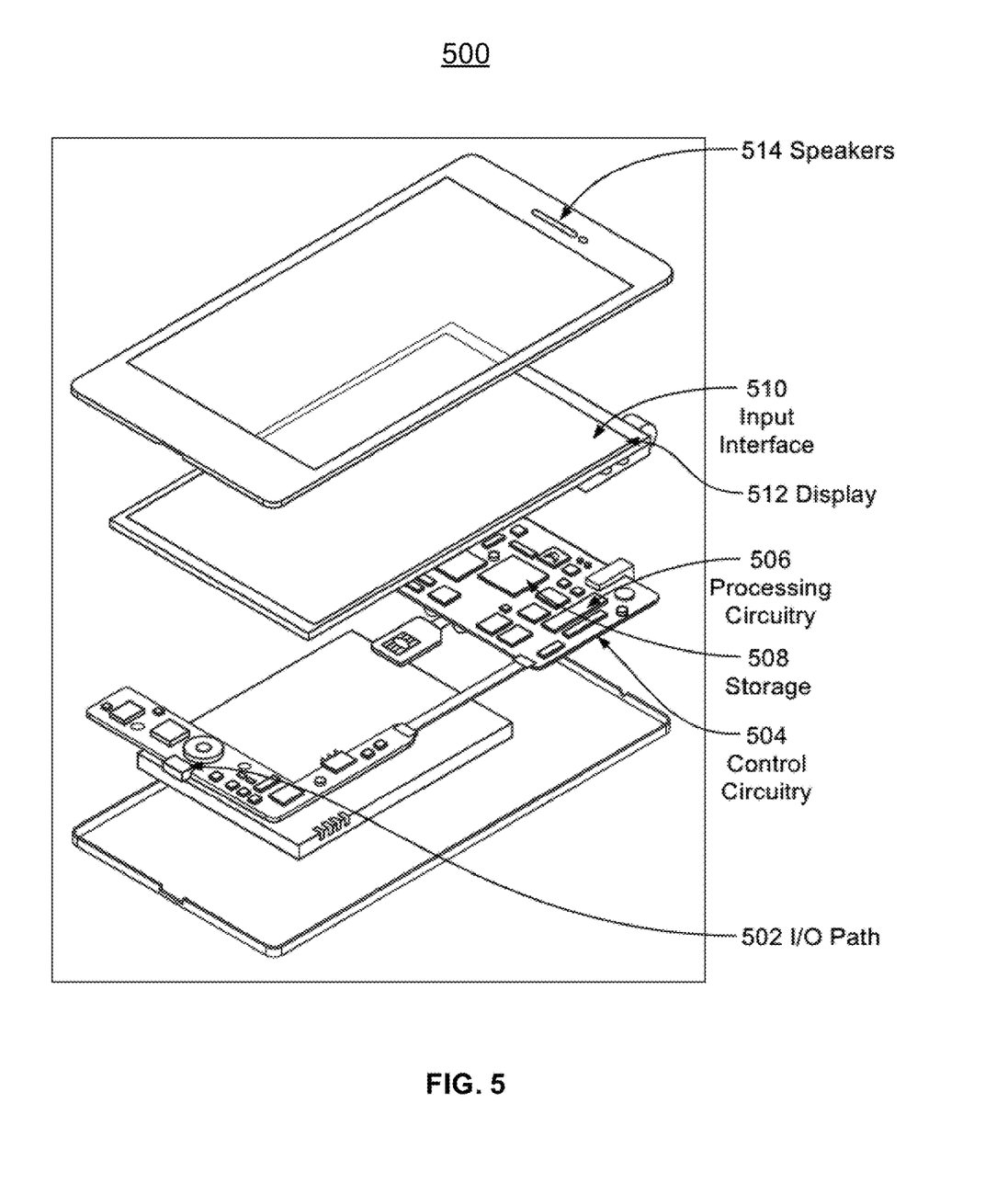
FIG. 5 is a block diagram of an illustrative device for generating and presenting content recommendations to new users, in accordance with embodiments of the disclosure.

In some embodiments, the methods and systems described in connection with FIGS. 1-4 utilize a device to perform selection of recommended content for new users. FIG. 5 is a block diagram of an illustrative device 500, in accordance with some embodiments of the present disclosure. As referred to herein, device 500 should be understood to mean any device that can perform selection of new user content recommendations. As depicted, device 500 may be a smartphone or tablet, or may additionally be a personal computer or television equipment. In some embodiments, device 500 may be an augmented reality (AR) or virtual reality (VR) headset, smart speakers, or any other device capable of determining and outputting an indication of matched promotional content.

Device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for executing one or more of the machine learning model 200 and recommendation engine 210, i.e., for determining content genres for a new user, determining recommended content therefrom, and fully populating onboarding pages with representations of the recommended content.

An application on a device may be a stand-alone application implemented on a device or a server. The application may be implemented as software or a set of executable instructions. The instructions for performing any of the embodiments discussed herein of the application may be encoded on non-transitory computer-readable media (e.g., a hard drive, random-access memory on a DRAM integrated circuit, read-only memory on a BLU-RAY disk, etc.) or transitory computer-readable media (e.g., propagating signals carrying data and/or instructions). For example, in FIG. 5 the instructions may be stored in storage 508, which can be executed by control circuitry 504 of device 500.

Figure 6:
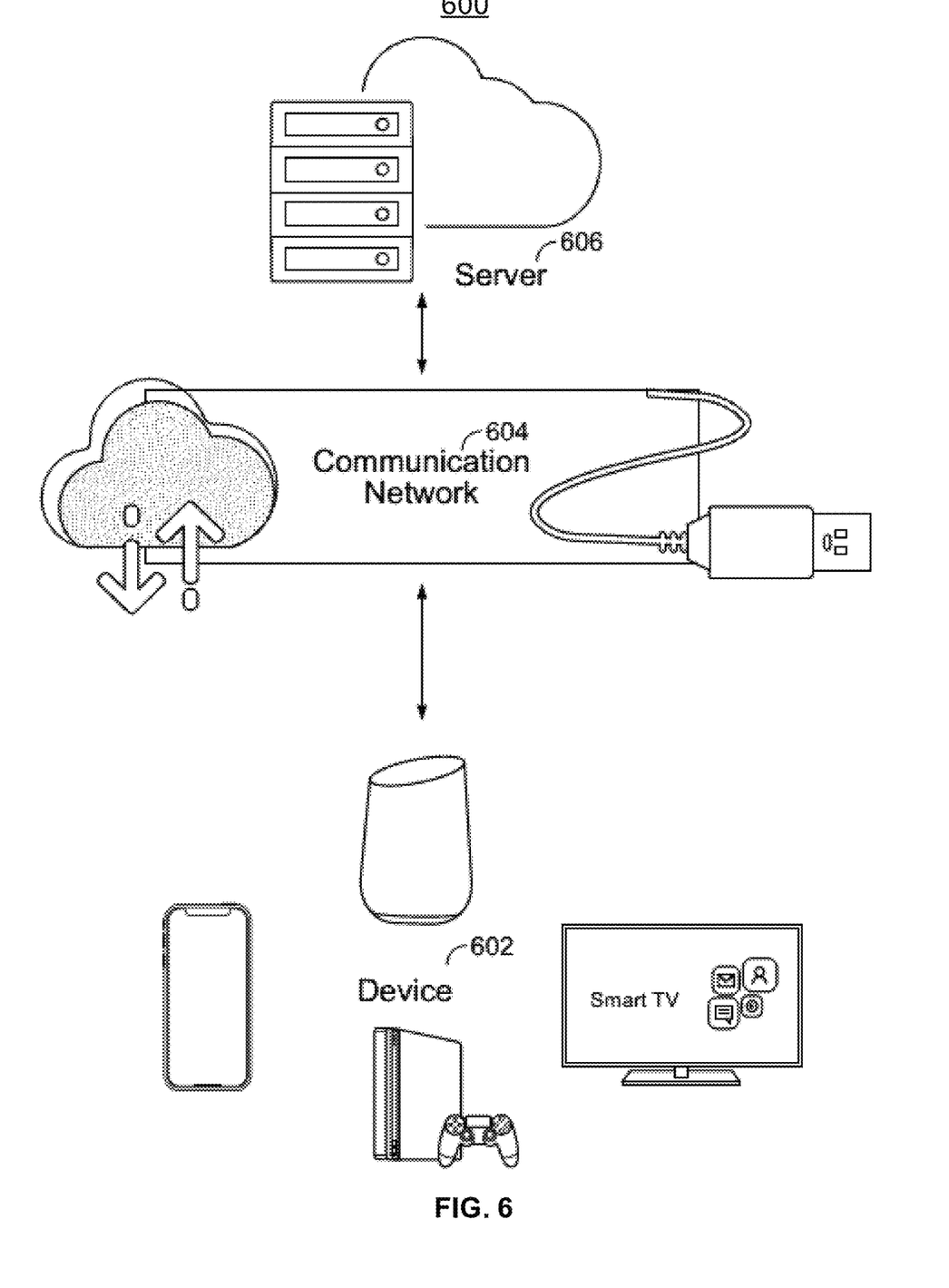
FIG. 6 is a block diagram of an illustrative system for generating and presenting content recommendations to new users, in accordance with embodiments of the disclosure.

In some embodiments, an application may be a client-server application where only the client application resides on device 500 (e.g., device 602), and a server application resides on an external server (e.g., server 606). For example, an application may be implemented partially as a client application on control circuitry 504 of device 500 and partially on server 606 as a server application running on control circuitry. Server 606 may be a part of a local area network with device 602, and, in other examples, may be part of a cloud computing environment accessed via the Internet. In a cloud computing environment, various types of computing services for performing searches on the Internet or informational databases, gathering information for a display (e.g., information for providing deep recommendations for display), or parsing data are provided by a collection of network-accessible computing and storage resources (e.g., server 606), referred to as "the cloud." Device 500 may be cloud clients that rely on the cloud computing capabilities from server 606 to gather data to populate an application. When executed by control circuitry of server 606, the system may instruct the control circuitry to provide content matching on device 602. The client application may instruct control circuitry of the receiving device 602 to provide matched promotional content. Alternatively, device 602 may perform all computations locally via control circuitry 504 without relying on server 606.

Control circuitry 504 may include communications circuitry suitable for communicating with a content server or other networks or servers. The instructions for carrying out the above-mentioned functionality may be stored and executed on server 606. Communications circuitry may include a cable modem, a wireless modem for communications with other equipment, or any other suitable communications circuitry. Such communications may involve the Internet or any other suitable communication network or paths. In addition, communications circuitry may include circuitry that enables peer-to-peer communication of devices, or communication of devices in locations remote from each other.

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, or any other suitable fixed or removable storage devices, and/or any combination of the same. Non-volatile memory may also be used (e.g., to launch a boot-up routine and other instructions). Cloud-based storage (e.g., on server 606) may be used to supplement storage 508 or instead of storage 508.

Control circuitry 504 may include display generating circuitry and tuning circuitry, such as one or more analog tuners, one or more MP3 decoders or other digital decoding circuitry, or any other suitable tuning or audio circuits or combinations of such circuits. Encoding circuitry (e.g., for converting over-the-air, analog, or digital signals to audio signals for storage) may also be provided. Control circuitry 504 may also include scaler circuitry for upconverting and downconverting content into the preferred output format of the device 500. Circuitry 504 may also include digital-to-analog converter circuitry and analog-to-digital converter circuitry for converting between digital and analog signals. The tuning and encoding circuitry may be used by the device to receive and to display, to play, or to record content. The tuning and encoding circuitry may also be used to receive guidance data. The circuitry described herein, including for example, the tuning, audio generating, encoding, decoding, encrypting, decrypting, scaler, and analog/digital circuitry, may be implemented using software running on one or more general purpose or specialized processors. Multiple tuners may be provided to handle simultaneous tuning functions. If storage 508 is provided as a separate device from device 500, the tuning and encoding circuitry (including multiple tuners) may be associated with storage 508.

A user may send instructions to control circuitry 504 using user input interface 510 of device 500. User input interface 510 may be any suitable user interface touchscreen, touchpad, stylus and may be responsive to external device add-ons such as a remote control, mouse, trackball, keypad, keyboard, joystick, voice recognition interface, or other user input interfaces. User input interface 510 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 512. Speakers 514 may be provided as integrated with other elements of device 500 or may be stand-alone units. Display 512 may be used to display visual content while audio content may be played through speakers 514. In some embodiments, the audio may be distributed to a receiver (not shown), which processes and outputs the audio via speakers 514.

Control circuitry 504 may allow a user to provide user profile information or may automatically compile user profile information. For example, control circuitry 504 may track user preferences for different genres of content. In some embodiments, control circuitry 504 monitors user inputs, such as queries, texts, calls, conversation audio, social media posts, etc., to detect user preferences. Control circuitry 504 may store the user preferences in the user profile. Additionally, control circuitry 504 may obtain all or part of other user profiles that are related to a particular user (e.g., via social media networks), and/or obtain information about the user from other sources that control circuitry 504 may access. As a result, a user can be provided with real-time matched promotional content.

Device 500 of FIG. 5 can be implemented in system 600 of FIG. 6 as device 602. Devices from which matched promotional content may be output may function as a standalone device or may be part of a network of devices. Various network configurations of devices may be a smartphone or tablet, or may additionally be a personal computer or television equipment. In some embodiments, device 602 may be an augmented reality (AR) or virtual reality (VR) headset, smart speakers, or any other device capable of outputting matched promotional content to a user.

In system 600, there may be multiple devices but only one of each type is shown in FIG. 6 to avoid overcomplicating the drawing. In addition, each user may utilize more than one type of device and also more than one of each type of device.

As depicted in FIG. 6, device 602 may be coupled to communication network 604. Communication network 604 may be one or more networks including the Internet, a mobile phone network, mobile voice or data network (e.g., a 4G or LTE network), cable network, public switched telephone network, Bluetooth, or other types of communications network or combinations of communication network. Thus, device 602 may communicate with server 606 over communication network 604 via communications circuitry described above. Server 606 may store and execute instruction modules for implementing one or both of machine learning model 200 and recommendation engine 210, to perform processes of embodiments of the disclosure. Server 606 may also store (via a known storage device such as or similar to storage 508) and execute instruction modules for training model 200, as described further below. In this manner, server 606 may detect new users, perform operations to carry out processes of embodiments of the disclosure to recommend content to new users, and to transmit content representations to device 602 in order to generate fully populated onboarding pages for new users. It should be noted that there may be more than one server 606, but only one is shown in FIG. 6 to avoid overcomplicating the drawing. The arrows connecting the respective device(s) and server(s) represent communication paths, which may include a satellite path, a fiber-optic path, a cable path, a path that supports Internet communications (e.g., IPTV), free-space connections (e.g., for broadcast or other wireless signals), or any other suitable wired or wireless communications path or combination of such paths. Further details of the present disclosure are discussed below in connection with the flowcharts of FIGS. 7-11. It should be noted that the steps of processes of each of FIGS. 7-11, respectively, may be performed by control circuitry 504 of FIG. 5.

In operation, processes of embodiments of the disclosure may be executed by any of the computing devices of FIG. 6. As one example, such processes may be executed by one or more of device 602 or server 606. More specifically, either of device 602 or server 606 may store and execute instruction modules implementing one or more of machine learning model 200 and recommendation engine 210.

Figure 7:
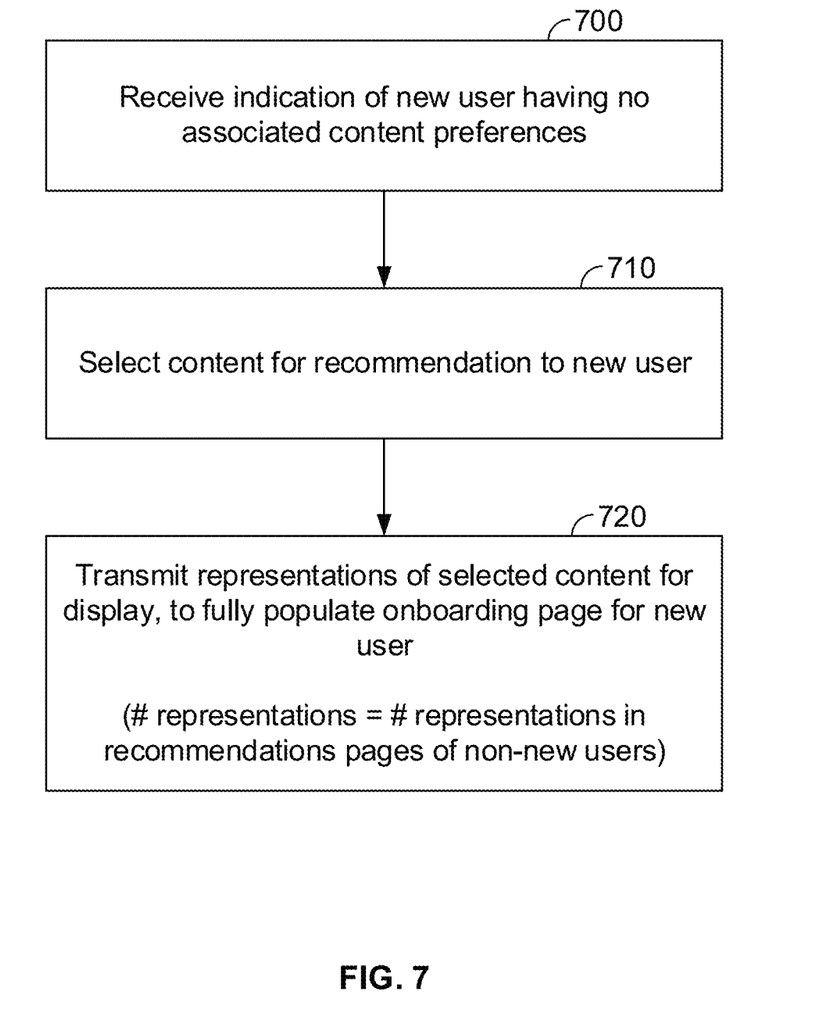
FIG. 7 is a flowchart of an illustrative process for generating and presenting content recommendations to new users, in accordance with embodiments of the disclosure.

FIG. 7 is a flowchart of an illustrative process for generating and presenting content recommendations to new users, in accordance with embodiments of the disclosure. Initially, device 602 may execute and display an onboarding interface for its user, to carry out an onboarding process to subscribe the user to a content delivery service. As part of this process, device 602 may transmit onboarding data to server 606, indicating a new user subscription (Step 700). As this user is a new user, server 606 does not yet have a record of this user's content preferences. Server 606 may then implement machine learning model 200 and recommendation engine 210, to select content for recommendation to the new user (Step 710) as in FIG. 2. The server 606 may then transmit representations of this selected content, such as thumbnail images of the selected content, for display by device 602 (Step 720) during or upon completion of the onboarding process, as a set of content recommendations for the new user. In particular, the representations of recommended content may be arranged to fully populate the recommended content portion of an onboarding page meant for the new user. That is, the number of representations of recommended content may be equal to the number of representations allocated in the onboarding page for recommended content. In some embodiments, the number of representations allocated may be the same as the number of representations allocated in content recommendation pages, or sections thereof, of non-new users. That is, systems of embodiments of the disclosure may determine at least the same number of content recommendations for new users as is determined for non-new users.

Figure 8:
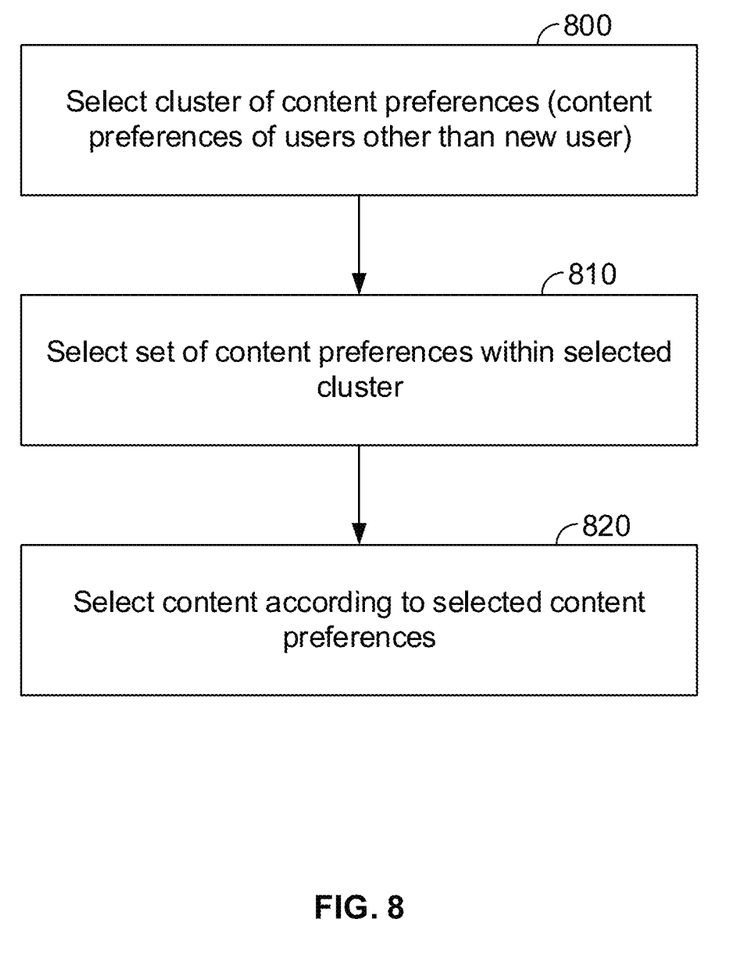
FIG. 8 is a flowchart illustrating further details of exemplary content selection processes, in accordance with embodiments of the disclosure.

FIG. 8 is a flowchart illustrating further details of exemplary content selection processes, in accordance with embodiments of the disclosure. That is, FIG. 8 illustrates further details of Step 710 above, describing how recommended content may be selected for a new user. Initially, server 606 or another device may select a cluster of content preferences, the cluster being a region in the genre hyperspace used by machine learning model 200 (Step 800). As above, the server 606 may select a particular cluster such as the largest cluster, a most central cluster, a cluster having the largest number of recent entries, or the like.

Once a cluster is selected, a set of content preferences within the selected cluster may be picked (Step 810). That is, a hyperspace point within the selected cluster may be picked as the set of genre values to be used for content recommendation to the new user. Recommendation engine (as implemented by, e.g., server 606) may then select content according to the selected genre values (Step 820). In this manner, the determined genre values may act as user content preferences for determining recommendations of content to the new user. As above, server 606 may implement recommendation engine 210 to select recommended content from an input set of genre values or genre preferences. In particular, recommendation engine 210 may select content having the same or similar genre scores as recommended content. Embodiments of the disclosure contemplate selection of recommended content in any manner, such as by any measure of similarity of genre scores, any machine learning-based matching of genre values to content, or the like.

Figure 9:
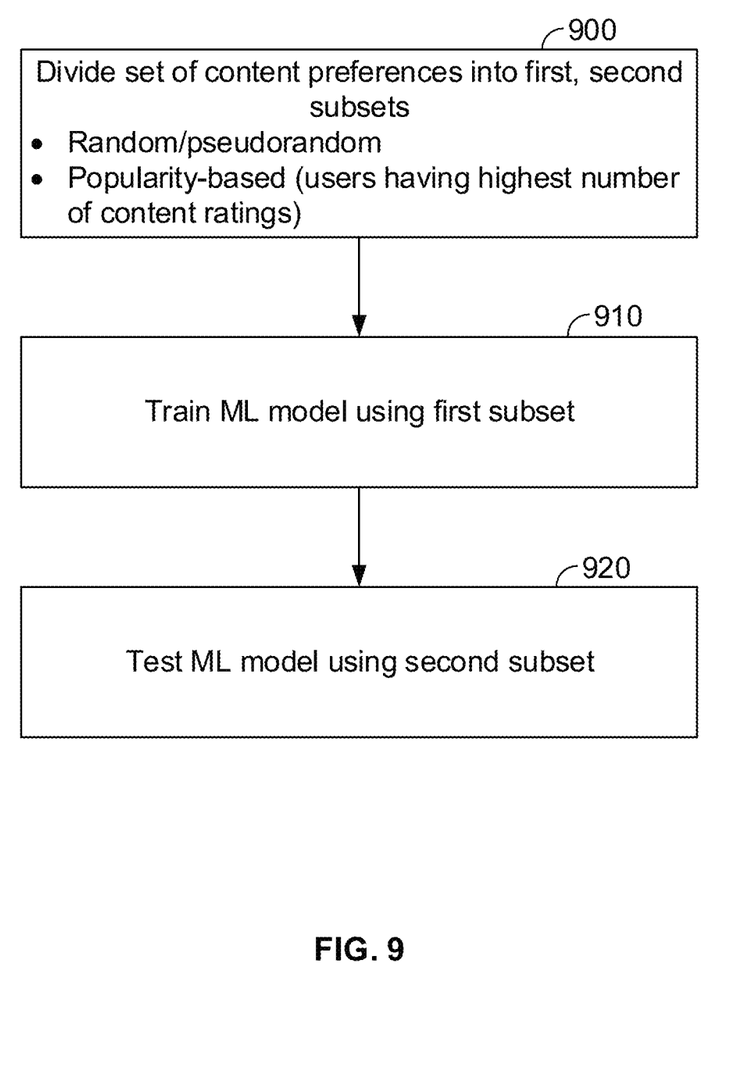
FIG. 9 is a flowchart illustrating further details of training of machine learning models, in accordance with embodiments of the disclosure.

Embodiments of the disclosure also contemplate training of machine learning model 200 in any manner. FIG. 9 is a flowchart illustrating further details of training of machine learning models, in accordance with embodiments of the disclosure. Initially, in some embodiments, a set of content preferences may be compiled, where each member of the set is a set of values for each genre listed in FIG. 4. Each member of the set may represent the genre values corresponding to, e.g., content preferences of a past or existing user of the content delivery service. That is, machine learning model 200 may be trained on the content preferences of prior users, and the behavior of these prior users may be extrapolated to new users. As in many machine learning applications, at least some embodiments of the disclosure contemplate a large set of content preferences for use in training machine learning model 200.

The set of content preferences, or genre values, may be divided into two subsets, which may be referred to as first and second subsets (Step 900). Division into subsets may be performed in any manner, such as by random or pseudorandom selection of set members for placement in either the first or second subset. The subsets may also be of any suitable size. For example, each subset may be half the size of the set of content preferences, the first and second subsets may comprise 70% and 30% respectively of the set of content preferences, or the like. Each subset may be any proportion of the set of content preferences.

The first subset may be used to train the machine learning model 200, while the second subset may be used to test the model 200. In some embodiments, the first or training subset may be larger than the second or testing subset.

Once the training and testing subsets are determined, certain set elements may optionally be removed from the training subset. In particular, set elements corresponding to popular users may be removed from the training subset. Content preferences of popular users, or users that have viewed a significant amount of content, may be expected to follow the cluster space, i.e., fall within one or more defined clusters, as their behavior is well-known. Accordingly, content preferences of popular users may be removed from the training set and optionally added to the testing set to verify the trained model, as their content preference information should fall within one or more clusters.

Popular users may be identified according to any criteria. As one example, users may be considered popular users if they have viewed, rated, or otherwise interacted with greater than some predetermined number of content items, where this predetermined number may be any value. For instance, users may be considered popular users if server 606 has a record of their interactions with greater than 5, 10, 20, or 50 content items. Embodiments of the disclosure further contemplate additional criteria for qualifying as a popular user. For instance, The machine learning model 200 may then be trained using the training subset (Step 910). As above, machine learning model 200 may be any one or more machine learning models suitable for clustering points in a hyperspace of content preferences, including an expectation maximization (EM) model, a k-means model, or a k-nearest neighbor model. Training of such models is known, and embodiments of the disclosure encompass any suitable training method or process for any such model(s).

Once machine learning model 200 is trained, server 606 may carry out testing of the trained model 200 (Step 920). Content preferences of the testing subset are input to trained model 200 and their corresponding clusters are determined. As above, this may include content preferences of popular users whose data points have been removed from the training subset, to verify that the model 200 is accurate for popular users. Once model 200 is verified in this manner, it may then be used in selection of recommended content for new users according to embodiments of the disclosure.

Figure 10:
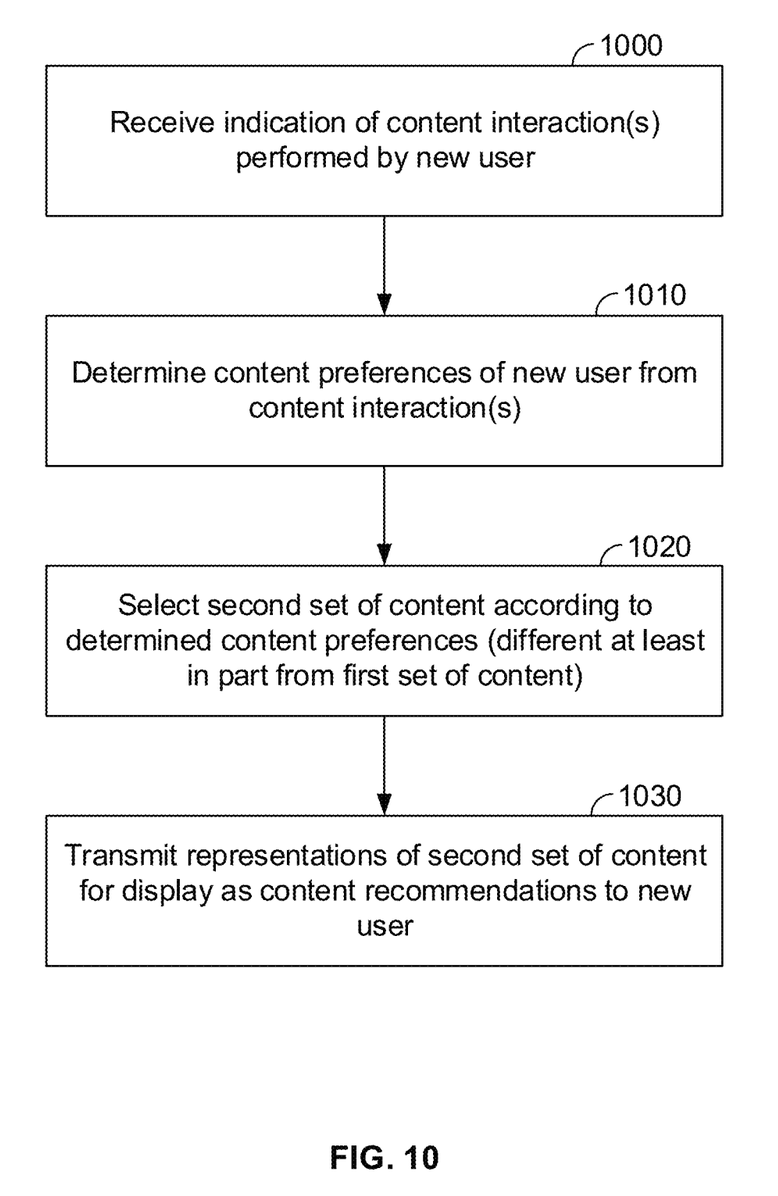
FIG. 10 is a flowchart illustrating an illustrative process for adaptive provision of content recommendations, in accordance with embodiments of the disclosure.

Once content is recommended for the new user such as via a fully populated onboarding page, embodiments of the disclosure contemplate adjustment or refinement of content recommendations as the new user begins to view content. That is, systems of embodiments of the disclosure may adapt to the new user's content viewing behavior, revising their content recommendations as more information on the new user's preferences becomes available. FIG. is a flowchart illustrating an illustrative process for adaptive provision of content recommendations, in accordance with embodiments of the disclosure. Here, server 606 first receives an indication of one or more content interactions performed by the new user on his or her device 602 (Step 1000). Such interactions may be any interactions with any content provided by the service to which the new user has subscribed, including viewings of content, likes or recommendations of content, dislikes or negative recommendations, viewings of content for greater than some predetermined duration, or the like. Interactions may be detected by either the device 602 or by the server 606, with the device 602 transmitting indicators of any detected interactions to server 606.

The server 606 then determines revised content preferences of the new user from these received or detected content interactions (Step 1010). Revised content preferences may be determined responsive to detected content interactions in any suitable manner. For example, the content genre values determined for the new user at Step 810 of FIG. 8 may be revised according to the detected content interactions. Revision may be performed in any suitable manner, such as by increasing those current genre values that correspond to the genres of content viewed or liked, decreasing the remaining genre values, or decreasing genre values that correspond to genres of content disliked or negatively reviewed, or the like. Revision of content genre values may be performed in any manner and by any amounts suitable for adapting genre preferences to new users as their viewing habits become known.

The server 606 then selects a revised set of content according to the revised content genre values (Step 1020), by applying as input to recommendation engine 210 the revised content genre values, and receiving as output therefrom a new set of recommended content that reflects the new user's content-related behavior. The server 606 then transmits representations of this new set of recommended content for display on device 602 as content recommendations to the user (Step 1030). By repeating Steps 1000-1020 as new indications of content interactions are received, embodiments of the disclosure provide an adaptive system that continually adjusts its content recommendations to users according to their ongoing content interaction behavior.

Figure 11:
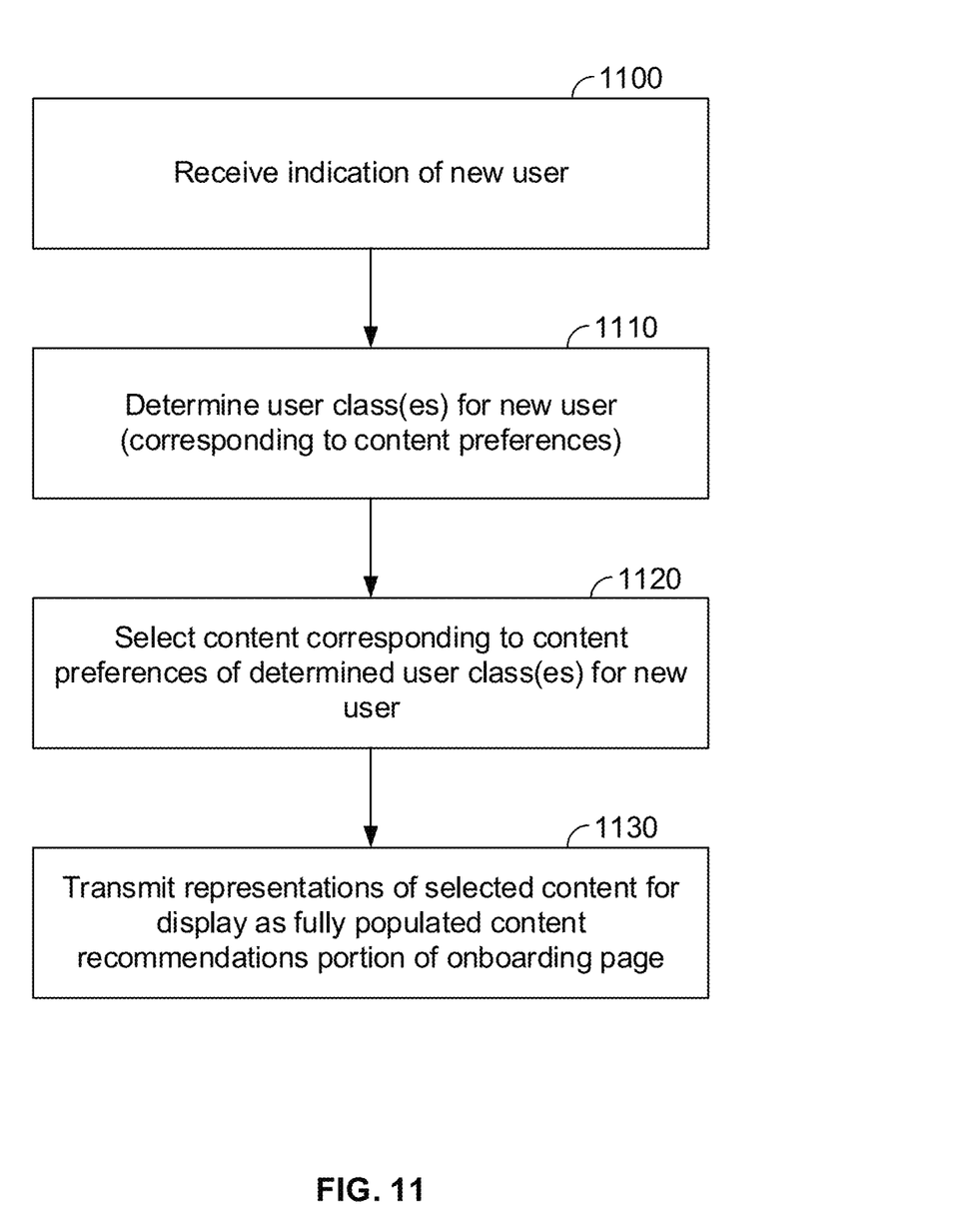
FIG. 11 is a flowchart of an illustrative process for generating and presenting content recommendations to new users, in accordance with further embodiments of the disclosure.

FIG. 11 is a flowchart of an illustrative process for generating and presenting content recommendations to new users, in accordance with further embodiments of the disclosure. Initially, server 606 receives an indication of a new user (Step 1100), which as above may be received during the course of a new user onboarding process carried out by device 602 or server 606. The server 606 may then determine one or more user classes for the new user, where these user classes correspond to content preferences (Step 1110). In some embodiments of the disclosure, these user classes may correspond to identifications of clusters determined by machine learning model 200.

Server 606 then selects content corresponding to content preferences of these user classes (Step 1120). As above, a point within user classes or clusters may be picked, such as by selecting a centroid or hyperspace center of the class or cluster, selecting a random point within the class/cluster, or in any other manner. The genre values corresponding to the selected hyperspace point are then determined, and used by recommendation engine 210 to select recommended content. Representations of this selected content are then transmitted for display by device 602 in a fully populated content recommendations portion of an onboarding page (Step 1130).

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, content recommendations can be selected via any suitable machine learning model or any other mechanism, and may be selected according to content genres or any other characterizations of content. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method comprising:
    determining that content recommendations are to be made for a new user;
    determining, according to a cluster of user preference data identified by a machine learning model, a set of user classes to which the new user belongs,
    wherein the machine learning model identifies the cluster of user preference data by:
        dividing a collection of user preference data for media content items, the collection being based on user preferences of a plurality of users and being organized by content genre, into a training set of user content preference data and a testing set of user content preference data, wherein in the dividing of the collection of user preference data, each item of the user preference data is assigned to the training set or to the testing set based on a frequency of content consumption or content interaction by a respective user of the plurality of users;
        training the machine learning model using the training set of user content preference data; and
        verifying the machine learning model using the testing set of user content preference data; and
    generating a display of the content recommendations for the new user according to the set of user classes to which the new user is assigned by the machine learning model.

2. The method of claim 1, wherein the determining that the content recommendations are to be made for the new user is performed as part of an onboarding process of the new user; and
    the generating of the display of the content recommendations for the new user is performed as part of the onboarding process of the new user.

3. The method of claim 1, wherein the determining the set of user classes to which the new user belongs further comprises selecting one or more clusters of user preference data for media content from among a plurality of clusters of user preference data for media content, each cluster representing content preferences of a subset of the plurality of users, the plurality of users excluding the new user.

4. The method of claim 1, wherein the machine learning model comprises one or more of an expectation maximization (EM) model, a k-means model, or a k-nearest neighbor model.

5. The method of claim 1, wherein the dividing is performed such that the training set of user content preference data excludes user content preference data of users with greater than a threshold frequency of content consumption.

6. The method of claim 5, wherein the user content preference data of users with the greater than the threshold frequency of content consumption are used in the testing set of user content preference data.

7. The method of claim 1, wherein the content recommendations displayed are a first set of content recommendations, the method further comprising:
    receiving an indication of one or more content interactions performed by the new user;
    determining content preferences of the new user from the one or more content interactions;
    selecting a second set of content recommendations according to the determined content preferences, the second set of content recommendations being different at least in part from the first set of content recommendations; and
    transmitting representations of the second set of content recommendations for display.

8. A system comprising:
    a storage device; and
    control circuitry configured:
        to determine that content recommendations are to be made for a new user;
        to determine, according to a cluster of user preference data identified by a machine learning model, a set of user classes to which the new user belongs,
        wherein the machine learning model identifies the cluster of user preference data by:
            dividing a collection, stored in the storage device, of user preference data for media content items, the collection being based on user preferences of a plurality of users and being organized by content genre, into a training set of user content preference data and a testing set of user content preference data, wherein in the dividing of the collection of user preference data, each item of the user preference data is assigned to the training set or to the testing set based on a frequency of content consumption or content interaction by a respective user of the plurality of users;

training the machine learning model using the training set of user content preference data; and verifying the machine learning model using the testing set of user content preference data; and to generate a display of the content recommendations for the new user according to the set of user classes to which the new user is assigned by the machine learning model.

9. The system of claim 8, wherein the determining that the content recommendations are to be made for the new user is performed as part of an onboarding process of the new user; and the generating of the display of the content recommendations for the new user is performed as part of the onboarding process of the new user.

10. The system of claim 8, wherein the determining the set of user classes to which the new user belongs further comprises selecting one or more clusters of user preference data for media content from among a plurality of clusters of user preference data for media content, each cluster representing content preferences of a subset of the plurality of users, the plurality of users excluding the new user.

11. The system of claim 8, wherein the machine learning model comprises one or more of an expectation maximization (EM) model, a k-means model, or a k-nearest neighbor model.

12. The system of claim 8, wherein the dividing is performed such that the training set of user content preference data excludes user content preference data of users with greater than a threshold frequency of content consumption.

13. The system of claim 12, wherein the user content preference data of users with the greater than the threshold frequency of content consumption are used in the testing set of user content preference data.

14. The system of claim 8, wherein the content recommendations displayed are a first set of content recommendations, the control circuitry further configured:

to receive an indication of one or more content interactions performed by the new user;

to determine content preferences of the new user from the one or more content interactions;

to select a second set of content recommendations according to the determined content preferences, the second set of content recommendations being different at least in part from the first set of content recommendations; and to transmit representations of the second set of content recommendations for display.

15. A method comprising:

determining that content recommendations are to be made for a new user;

determining, according to a cluster of user preference data identified by a machine learning model, a set of user classes to which the new user belongs, wherein the machine learning model identifies the cluster of user preference data by:

dividing a collection of user preference data for media content items, the collection being based on user preferences of a plurality of users and being organized by content genre, into a training set of user content preference data and a testing set of user content preference data, wherein the dividing is based on a frequency of content consumption by the plurality of users;

training the machine learning model using the training set of user content preference data; and verifying the machine learning model using the testing set of user content preference data; and generating a display of the content recommendations for the new user according to the set of user classes to which the new user belongs wherein the dividing is performed such that the training set of user content preference data excludes user content preference data of users with greater than a threshold frequency of content consumption, wherein the user content preference data of users with the greater than the threshold frequency of content consumption are used in the testing set of user content preference data.

* * * * *